United States Patent [19]

Shibata et al.

[11] Patent Number: 5,109,069

[45] Date of Patent: Apr. 28, 1992

[54] HYDROGENATED DIENE COPOLYMER-CONTAINING RESIN COMPOSITION AND PROCESS FOR PRODUCING THE SAME

[75] Inventors: Tooru Shibata; Toshio Teramoto; Yasuo Takeuchi, all of Yokkaichi; Kenya Makino, Kuwana; Masaaki Mawatari, Suzuka; Minoru Maeda, Mie; Shinichi Kimura, Yokkaichi; Minoru Hasegawa, Suzuka; Kunio Goshima; Mikio Takeuchi, both of Yokkaichi, all of Japan

[73] Assignee: Japan Synthetic Rubber Co., Ltd., Tokyo, Japan

[21] Appl. No.: 446,692

[22] Filed: Dec. 6, 1989

[30] Foreign Application Priority Data

Dec. 9, 1988 [JP] Japan .................. 63-311575

[51] Int. Cl.$^5$ .................... C08L 23/12; C08L 25/10; C08L 71/12
[52] U.S. Cl. ................... 525/152; 525/240; 525/241; 525/905
[58] Field of Search ........... 525/95, 240, 152, 241, 525/905

[56] References Cited

U.S. PATENT DOCUMENTS

| | | | |
|---|---|---|---|
| 3,441,530 | 4/1969 | Bauer et al. .................... | 525/95 |
| 3,595,942 | 7/1971 | Wald et al. ...................... | 525/332.9 |
| 4,088,626 | 5/1978 | Gergen et al. . | |
| 4,090,996 | 5/1978 | Gergen et al. . | |
| 4,119,607 | 10/1978 | Gergen et al. . | |
| 4,226,952 | 10/1980 | Halasa et al. . | |

FOREIGN PATENT DOCUMENTS 1359740  7/1974  United Kingdom .
1477706  6/1977  United Kingdom .

*Primary Examiner*—Jacob Ziegler
*Attorney, Agent, or Firm*—Oblon, Spivak, McClelland, Maier & Neustadt

[57] ABSTRACT

A hydrogenated diene copolymer resin composition comprising (A) 5–70% by weight of a hydrogenated diene copolymer which is a hydrogenation product of a random copolymer of at least one conjugated diene and 3–50% by weight of an alkenyl aromatic compound having a number average molecular weight of 5,000–1,000,000 and a molecular weight distribution (Mw/Mn) of 10 or less, the vinyl content in the diene portion of the random copolymer being 10–90%, at least 70% of the olefinic unsaturation of the random copolymer being hydrogenated, and (B) 95–30% by weight of at least one resin selected from the group consisting of a polypropylene resin, a polyphenylene ether resin and an alkenyl aromatic compound polymer resin. The hydrogenated diene copolymer (A) can be used in combination with (B) a polyphenylene ether resin and (C) at least one member selected from the group consisting of a polyamide and a thermoplastic polyester in such a proportion that the amount of (A) is 1–50 parts by weight, the amount of (B) is 10–89 parts by weight and the amount of (C) is 10–89 parts by weight. The above composition has improved impact resistance and improved gloss and appearance of molded article.

14 Claims, No Drawings

HYDROGENATED DIENE COPOLYMER-CONTAINING RESIN COMPOSITION AND PROCESS FOR PRODUCING THE SAME

This invention relates to a hydrogenated diene copolymer-containing resin composition having improved impact resistance and improved gloss and appearance of molded article, and a process for producing the composition.

Propylene resin is used in a large amount in the interior and exterior trim of automobile, particularly bumper of automobile, and the like in view of its moldability, price and the like. However, it is inferior in impact resistance at low temperatures and coating strength, and therefore, it is blended with a modifier such as an ethylene-propylene copolymer rubber or the like (see, for example, Japanese Patent Application Kokoku No. 37-8,483 and 36-150,432 and the like). Also, in order to enhance the impact resistance at low temperatures of polypropylene resin, the amount of the ethylene-propylene copolymer rubber added is increased or a high molecular weight ethylene-propylene copolymer rubber is added to the polypropylene resin.

However, when the amount of ethylene-propylene copolymer rubber added is increased, the stiffness is lowered, and when a high molecular weight ethylene propylene copolymer rubber is added to prevent the stiffness from being lowered, the dispersibility of the rubber becomes low and the surface gloss is also lowered.

Because of recent needs such as low fuel economy rating, fashion, personality and the like, the bumper of automobile has been changed in shape and large-sized. Therefore, the physical properties which a bumper material is required to have been diversified. One of the required physical properties is directed to flexibilization in view of safety. Heretofore, for the flexibilization of a polypropylene resin composition, it has been proposed to increase the amount of the ethylene-propylene copolymer rubber added or add a plasticizer such as a mineral oil or the like.

However, when the amount of ethylene-propylene copolymer rubber added is increased, there is a problem that the moldability of the composition becomes inferior, in other words, the surface of a molded article becomes sticky. Also, when a plasticizer such as a mineral oil or the like is added, the flexibilization can be achieved but there is a problem that the mineral oil oozes out to the surface of molded article.

As mentioned above, the addition of a modifier such as ethylene-propylene copolymer rubber or the like to a polypropylene resin has been known; however, the improvement obtained thereby is still insufficient. In addition, such a modifier as ethylene-propylene copolymer rubber or the like is insufficient to meet the diversification of the required physical properties.

Moreover, thermoplastic resin such as polyphenylene ether resin, polystyrene resin and the like are unsatisfactory in impact resistance, and the fields of use thereof are limited.

In order to remedy the above disadvantage, a styrene-butadiene random copolymer, a styrene-butadiene block copolymer or a polybutadiene or the like has been incorporated into and dispersed in such thermoplastic resins by a mechanical method.

However, in the method of dispersing a rubbery polymer in a resin by a mechanical method, a mere brittle mixture is obtained when the two have no affinity to each other. When the affinity is good, the impact resistance ca be improved; however, the other mechanical characteristics of the resin cannot be sufficiently improved. In addition, the surface gloss of molded article therefrom is not satisfactory, and in the molded article, molecules are highly oriented, so that the molded article is greatly different in impact resistance depending upon places. Therefore, the appearance of the molded article become bad.

Furthermore, the resin modified by such a rubbery polymer is inferior in weather resistance and resistance to heat deterioration.

A method of blending a styrene-butadiene block copolymer with the resin can be used; however, molded articles of the resulting blend tend to have pearl-like gloss on their surface.

Polyphenylene ether resins have excellent mechanical properties, electrical properties and heat resistance, and are good in dimension stability, so that attention is paid thereto as a resin suitable for uses in a wide field. However, the resins are inferior in moldability.

In order to improve the moldability of a polyphenylene ether resin, Japanese Patent Application Kokoku No. 45-997 proposes blending a polyamide therewith and Japanese Patent Application Kokoku No. 51-21,664 proposes blending a thermoplastic polyester therewith. However, the polyphenylene ether resin is very poor in compatibility with the polyamide and thermoplastic polyester, and the resulting resin composition is inferior in mechanical characteristics, and molded articles obtained by injection-molding the resin composition are very low in impact resistance.

In order to improve the compatibility between the polyphenylene ether resin and the polyamide resin, Japanese Patent Application Kohyo No. 61-502,195 and Japanese Patent Application Kokai No. 57-36,150 propose using a polycarboxylic acid; Japanese Patent Application Kokai No. 57-36,150 further proposes using a styrene maleic acid anhydride copolymer; Japanese Patent Application Kokoku No. 60-11,966 proposes adding an unsaturated compound having a specific functional group in the step of melt-mixing; Japanese Patent Application Kokai No. 61-204,262 proposes modifying a polyphenylene ether with an acid anhydride group; Japanese Patent Application Kokai No. 62-129,348 proposes using an ethylene-α-olefin copolymer modified with a specific functional group and a styrene resin; Japanese Patent Application Kokai No. 62-127,339 proposes using a styrene-butadiene-styrene block copolymer as a rubber and Japanese Patent Application Kokai No. 62-81,449 proposes using a partially hydrogenated styrene-butadiene-styrene block copolymer as a rubber.

However, when a styrene-butadiene-styrene block copolymer or a partially hydrogenated styrene-butadiene-styrene block copolymer is blended as a rubber with a polyphenylene ether-polyamide composition or a partially hydrogenated styrene-butadiene-styrene block copolymer is used as proposed in the above publications, the heat resistance and the surface appearance of molded article are inferior and the heat resistance, Particularly heat distortion.

Moreover, the addition of a rubber-modified polystyrene is known as a method of improving the impact resistance and processability of a polyphenylene ether.

However, the rubber-modified polystyrene is usually obtained by dissolving a styrene monomer in a rubbery polymer and then subjecting the resulting solution to bulk-suspension polymerization. Therefore, it is necessary to limit the amount of the rubbery polymer used in order to conduct the phase transfer favorably, and the rubbery polymer is usually used in a proportion of about 10% by weight of the weight of the rubber-modified polystyrene.

A composition consisting of a rubber-modified polystyrene and a polyphenylene ether in such a proportion is insufficient in impact resistance and, in some cases, the corner parts or thin wall portions of a molded article are cracked when the molded article is taken out of a mold in the molding step.

For the purpose of improving the impact resistance, the addition of a styrene-butadiene-styrene block copolymer or a hydrogenated styrene-butadiene-styrene block copolymer to the composition consisting of a polyphenylene ether and a rubber-modified polystyrene has been proposed; however, the use of such a rubber results in deterioration of heat resistance and generation of pearl-like gloss. As a result, the appearance of a molded article becomes bad.

The present inventors have made extensive study to solve the above-mentioned problems, and have found that the problems can be solved by incorporating a specific hydrogenated diene copolymer into a resin selected from a polypropylene resin, a polyphenylene ether resin and an alkenyl aromatic compound polymer resin.

An object of this invention is to provide a hydrogenated diene copolymer-containing resin composition which has improved processability, surface gloss, coatability and impact resistance and can meet various requirements concerning physical properties.

Another object of this invention is to provide a process for producing such a hydrogenated diene copolymer containing resin composition.

Other objects and advantages of this invention will become apparent from the following description.

According to this invention, there is provided a hydrogenated diene copolymer-containing resin composition comprising (A) 5-70% by weight of a hydrogenated diene copolymer which is a hydrogenation product of a random copolymer of at least one conjugated diene and 3-50% by weight of an alkenyl aromatic compound having a number average molecular weight of 5,000-1,000,000 and a molecular weight distribution (Mw/Mn) of 10 or less, the vinyl content in the diene portion of the copolymer being 10-90%, at least 70% of the olefinic unsaturation of the random copolymer being hydrogenated, and (B) 95-30% by weight of at least one resin selected from the group consisting of a polypropylene resin, a polyphenylene ether resin and an alkenyl aromatic compound Polymer resin.

This invention further provides a process for producing the above hydrogenated diene copolymer containing resin composition, which comprises melt-mixing (A) 50-80% by weight of a hydrogenated diene copolymer which is a hydrogenation product of a random copolymer of at least one conjugated diene and 3-50% by weight of an alkenyl aromatic compound having an average molecular weight of 5,000-1,000,000 and a molecular weight distribution (Mw/Mn) of 10 or less, the vinyl content in the diene portion of the copolymer being 10-90%, at least 70% of the olefinic unsaturation of the random copolymer being hydrogenated, and (B) 50-20% by weight of at least one resin selected from the group consisting of a polypropylene resin, a polyphenylene ether resin and an alkenyl aromatic compound polymer resin and further melt-mixing the resulting mixture in the form of pellets or a block with the same at least one resin as above.

This invention still further provides a thermoplastic resin composition comprising (A) 1-50 parts by weight of the above-mentioned hydrogenated diene copolymer, (B') 89-5 parts by weight of a polyphenylene ether resin and (C) 10-89 parts by weight of a polyamide and/or a thermoplastic polymer.

The random copolymer of at least one conjugated diene and 3-50% by weight of an alkenyl aromatic compound (hereinafter referred to as the random copolymer) which is the starting material of the hydrogenation product (A) used in this invention can be obtained by anionic living polymerization of the monomers in a hydrocarbon solvent with an organolithium initiator. The random copolymer can be converted into a branched polymer by adding a tri- or more functional coupling agent just before the completion of the anionic living polymerization and subjecting the random copolymer to coupling reaction.

The conjugated diene monomers used in the random copolymer includes, for example, 1,3-butadiene, isoprene, 1,3-pentadiene, 2,2'-dimethylbutadiene, 3-ethylbutadiene and the like. Preferred are 1,3-butadiene, isoprene and 1,3-pentadiene, and 1,3-butadiene is more preferable. Also, the alkenyl aromatic compound includes styrene, α-methylstyrene, p-methylstyrene, p-ethylstyrene, vinylnaphthalene and the like. Styrene, p-methylstyrene and p-ethylstyrene are preferable, and styrene is more preferable.

The organolithium initiator may be n-butyllithium, sec-butyllithium, tert-butyllithium or the like. In the polymerization, hexane, heptane, methylcyclohexane, cyclohexane, benzene, toluene, xylene, 2-methylbutene-1, 2-methylbutene-2 or the like may be used as the hydrocarbon solvent in the polymerization.

The control of the vinyl content such as 1,2-content, 3,4-content or the like may be effected by using an ether, a tertiary amine compound, and an alkali metal (sodium, potassium or the like), an alkoxide, a phenoxide or a sulfonate.

The polymerization may be batchwise or continuously effected usually at a temPerature of 0°-120° C. for a period of 10 minutes to 3 hours. The coupling agent is a tri- or more functional coupling agent such as tetrachlorosilicon, butyltrichlorosilicon, tetrachlorotin, butyltrichlorotin, tetrachlorogermanium, bis(trichlorosilyl)ethane, epoxidized linseed oil, tolylene diisocyanate, 1,2,4-benzene triisocyanate or the like.

The hydrogenated diene copolymer (A) is obtained by hydrogenating the thus obtained random copolymer.

In the hydrogenated diene copolymer (A) used in this invention, the hydrogenation percentage of the olefinic unsaturation is at least 70%, preferably at least 80%. When the hydrogenation percentage is less than 70%, the weather resistance and heat resistance of the polymer cannot be sufficiently improved, and hence, the uses thereof are limited.

The hydrogenation is effected by dissolving the above random copolymer in the hydrocarbon solvent and subjecting the resulting solution to a temperature of 20°-150° C. and a hydrogenation pressure of 1-100 kg/cm$^2$ in the presence of a hydrogenation catalyst.

As the hydrogenation catalyst, there is used a catalyst in which a noble metal such as palladium, ruthenium, platinum or the like is supported on silica, carbon, diatomaceous earth or the like; a complex catalyst of rhodium, ruthenium, platinum or the like; a catalyst consisting of an organic carboxylic acid salt with cobalt, nickel or the like and an organoaluminum or organolithium; a hydrogenation catalyst consisting of a combination of a titanium compound such as dicyclopentadienyltitanium dichloride, dicyclopentadienyldiphenyltitanium, dichlopentadienyltitaniumditolyl, dicyclopentadienyltitaniumdibenzyl or the like with a reducing organometallic compound comprising lithium, aluminum or magnesium; or the like.

The vinyl content in the conjugated diene portion of the random copolymer which is the starting material for the hydrogenated diene copolymer (A) and the alkenyl aromatic compound content of the random copolymer are important factors for improving the physical properties of the hydrogenated diene copolymer-containing resin composition.

The state of the conjugated diene bound in the random copolymer is a factor for improving mainly the stiffness and flexibility of the hydrogenated diene copolymer-containing resin composition and the alkenyl aromatic compound content is a factor for improving the stiffness and impact resistance in good balance.

When stress is put on the improvement of the stiffness of the resin composition of this invention, the hydrogenated diene copolymer (A) is preferably derived from a random copolymer having a vinyl content falling in the region lower than the line indicated by the interrelation equation $x = y + 50$ in which x represents the vinyl content in the conjugated diene and $10 \leq x \leq 65$, preferably $15 \leq x \leq 65$ and y represents the alkenyl aromatic compound content and $3 \leq y \leq 50$, preferably $3 \leq y \leq 40$, more preferably $5 \leq y \leq 35$, and a hydrogenated diene copolymer-containing resin composition consisting of 5-70% by weight of the (A) component and 95-30% by weight of the (B) component has the characteristics that the stiffness is high and the impact resistance at low temperatures is high.

When the vinyl content of the random copolymer used for this purpose is less than 10%, the hydrogenated diene copolymer-containing resin composition of this invention has only a small effect on improving the impact resistance at low temperatures. When the vinyl content x exceeds the interrelation line of $x = y + 50$, the stiffness is lowered.

The increase of the alkenyl aromatic compound content is effective for enhancing the stiffness; however, when it exceeds 50% by weight, the effect on improving the impact resistance at low temperatures is lowered.

Also, when the alkenyl aromatic compound content Y is less than 3% by weight, the coating strength is lowered and the stiffness becomes insufficient.

On the other hand, when stress is put on the improvement of flexibility in the composition of this invention, the hydrogenated diene copolymer (A) is preferably derived from a random copolymer having a vinyl content higher than the line indicated by the interrelation equation $x = y + 50$ in which x represents the vinyl content and $50 \leq x \leq 90$, preferably $60 \leq x \leq 85$ and y represents the alkenyl aromatic compound content and $3 \leq y \leq 20$, and a hydrogenated diene copolymer-containing resin composition consisting of 5-70% by weight of the (A) component and 95-30% by weight of the (B) component is excellent in flexibility and flowability.

When the vinyl content x of the random copolymer used for this purpose is lower than the line indicated by the interrelation equation $x = y + 50$, the effect on flexibility becomes small.

When the vinyl content x exceeds 90%, the impact resistance at low temperatures is deteriorated. When the alkenyl aromatic compound content y is more than 20% by weight, the flexibility and impact resistance at low temperatures becomes insufficient. In particular, this tendency appears remarkably when a polypropylene resin is used as the (B) component.

Thus, the hydrogenated diene copolymer used in this invention has contradictory characteristics which depend upon balance between the vinyl content and the alkenyl aromatic compound content, and can respond widely to quality improvement of a thermoplastic resin.

In common with these uses, the molecular weight Mn of the random copolymer is 5,000 to 1,000,000, preferably 30,000 to 300,000. When it is less than 5,000, the hydrogenated diene copolymer used in this invention does not become rubbery but liquid, and the expected sufficient improvement of the stiffness and impact resistance at low temperatures cannot be achieved. When it exceeds 1,000,000, the flowability becomes too low, and the dispersion of the hydrogenated diene copolymer in the final composition becomes low and the surface gloss is deteriorated.

Also, the molecular weight distribution (Mw/Mn) is 10 or less, preferably 6 or less. When it exceeds 10, the flowability is deteriorated and the surface gloss is lowered. Moreover, the surface stickiness due to low molecular weight is caused.

The polypropylene resin used in this invention is not critical; however, may be a homopolymer of propylene obtained by homopolymerizing propylene with a transition metal catalyst called Ziegler-Natta catalyst or a propylene-ethylene or $\alpha$-olefin copolymer obtained by copolymerizing propylene and a small amount of ethylene or an $\alpha$-olefin having 4 to 12 carbon atoms.

When the above polypropylene resin is the copolymer, the proportion of ethylene or $\alpha$-olefin in the copolymer is usually 3-25% by weight and the copolymer may be either random or block copolymer.

The melt flow index of the polypropylene resin is preferably 0.3-100 g/10 min (230° C.), more preferably 2-70 g/10 min (230° C.).

The above polypropylene resins may be used alone or in combination of two or more.

The alkenyl aromatic compound polymer resin which may be used in this invention may be a homopolymer of an alkenyl aromatic compound or a copolymer of an alkenyl aromatic compound and other monomer copolymerizable therewith or a graft copolymer obtained by graft copolymerizing an alkenyl aromatic compound alone or in combination with other monomer copolymerizable therewith in the presence of a rubbery polymer, and these may be used alone or in combination of two or more.

The alkenyl aromatic compound includes styrene, $\alpha$-methylstyrene, p-methylstyrene, vinylxylene, chlorostyrene, bromostyrene and the like. These may be used alone or in combination of two or more. Of these, styrene and $\alpha$-methylstyrene are preferred.

The copolymerizable monomer includes alkenyl cyanide compounds such as acrylonitrile, methacrylonitrile and the like, which may be used alone or in combination of two or more. Acrylonitrile is particularly preferable. The copolymerizable monomer further includes alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate and the like; aryl acrylates such as phenyl acrylate, benzyl acrylate and the like; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, dodecyl methacrylate, octadecyl methacrylate, phenyl methacrylate and the like; aryl methacrylates such as phenyl methacrylate, benzyl methacrylate and the like; unsaturated acid anhydrides such as maleic anhydride, itaconic anhydride, citraconic anhydride and the like; unsaturated acids such as acrylic acid, methacrylic acid and the like; imide compound of $\alpha,\beta$-unsaturated dicarboxylic acids such as maleimide, N-methylmaleimide, N-butylmaleimide, N-(p-methylphenyl)maleimide, N-phenylmaleimide, N-cyclohexylmaleimide and the like; etc. These may be used alone or in combination of two or more within such a range that the rubber-modified thermoplastic resin aimed at in this invention is not adversely affected.

The rubbery polymer to be used in the preparation of the graft copolymer includes, for example, diene rubbers such as polybutadiene, polyisoprene, styrene-butadiene copolymer, acrylonitrile-butadiene copolymer and the like; non-diene rubbers such as ethylene-propylene copolymer, ethylene-butene copolymer, ethylene-propylene-non-conjugated diene terpolymer, acrylic rubber and the like, and these may be used alone or in combination of two or more.

When the monomer component is a mixture of an alkenyl aromatic compound and a monomer copolymerizable therewith, the proportion of the alkene.1 aromatic compound in the mixture is preferably at least 60% by weight, more preferably at least 80% by weight. When it is less than 60% by weight, no resin composition excellent in all of impact resistance, surface gloss of molded article and appearance of molded article can be obtained.

The alkenyl aromatic compound polymer resin is preferably (1) a homopolymer of an alkenyl aromatic compound, (2) a rubber-reinforced alkenyl aromatic compound polymer resin obtained by polymerizing an alkenyl aromatic compound in the presence of a rubbery polymer, (3) a copolymer of an alkenyl aromatic compound and an imide compound of an $\alpha,\beta$-unsaturated dicarboxylic acid or (4) a copolymer of an alkenyl aromatic compound and an alkyl (meth)acrylate.

The polyphenylene ether resin used in this invention is a polymer consisting of recurring units represented by the formula (1):

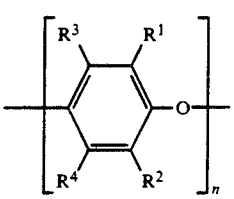

(1)

wherein $R^1$, $R^2$, $R^3$ and $R^4$, which may be the same or different, represent alkyl groups, aryl groups, halogen atoms or hydrogen atoms and n represents a degree of polymerization of 20 or more.

Specific examples thereof are poly(2,6-dimethyl-phenylene -1,4-ether), poly(2,6-diethylphenylene-1,4-ether), poly(2,6-dibromophenylene-1,4-ether), poly-(2-methyl-6-ethylphenylene-1,4-ether), poly(2-chloro-6-methylphenylene-1,4-ether), poly(2-ethyl -6-isopropyl-phenylene-1,4-ether), poly(2,6-di-n-propylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ethyl), poly(2-phenylphenylene -1,4-ether), poly(2-methyl-6-phenylphenylene -1,4-ether), poly(2,4'-methylphenylphenylene-1,4-ether), poly(2,3,6-trimethylphenylene-1,4-ether) and the like, copclymers of the monomers constituting the above polymers and graft copolymers of an alkenyl aromatic compound thereon. Homopolymer of 2,6-dimethylphenol and copolymer of 2,6-dimethylphenol and 2,3,6-trimethylphenol are particularly preferable.

The hydrogenated diene copolymer-containing resin composition of this invention can be produced from (A) the hydrogenated diene copolymer and (B) at least one resin selected from the group consisting of a polypropylene resin, a polyphenylene ether resin and an alkenyl aromatic compound polymer resin by a conventional method. For example, the hydrogenated diene copolymer (A) is melt-mixed with the at least one resin (B) using an extruder, kneader-blender, Banbury blender or the like. In this case, the melt-mixing is conducted so that the temperature becomes finally 170° C. or higher. Though the mixing method is not critical, the resin composition of this invention can be obtained by mixing the hydrogenated diene copolymer (A) with the at least cne resin (B) so that the final proportion of the (A) component to the (B) component falls within the range of this invention.

A better method is a method comprising melt-mixing 50-80% by weight of the hydrogenated diene copolymer (A) with 50-20% by weight of the at least one resin (B) and then further melt-mixing the resulting mixture in the form of pellets or a block with the same at least one resin as above. According to this method, a molded article excellent.in impact resistance, surface gloss and appearance can be obtained, and the handling of the hydrogenated diene copolymer (A) can be improved. That is, the blocking of the hydrogenated diene copolymer (A) can be completely prevented and the subsequent processing becomes easy.

The hydrogenated diene copolymer-containing resin composition may further comprise conventional additives such as antioxidant, heat stabilizer, ultraviolet absorber, carbon black, coloring agent and the like. Moreover, it may also comprise a filler such as calcium carbonate, kaolin, talc, asbestos, glass fiber or the like, and a rubber and/or a resin such as ethylenepropylene random copolymer, olefin (co)polymer rubber (for example, butyl rubber), low density polyethylene resin, high density polyethylene resin, polystyrene resin, acrylonitrile-butadiene-styrene resin, acrylonitrile butadiene-styrene copolymer resin, ethylene-vinyl acetate copolymer resin or its hydrogenation product, polybutadiene rubber or the like. For softening the resin, a mineral oil, a liquid or low molecular weight olefin (co)polymer or the like may be incorporated into the composition.

The hydrogenated diene copolymer-containing resin composition can be formed into various molded articles by injection molding, sheet-extrusion, vacuum forming, profile extrusion, expansion molding or the like.

The molded articles obtained by the above molding method can be used in exterior or interior trim material of automobile, electric or electronic parts, housings and the like utilizing the excellent properties of the molded articles.

The thermoplastic resin composition of this invention comprises 1–50 parts by weight of (A) the hydrogenated diene copolymer, (B') 89-5 parts by weight of a polyphenylene ether resin and (C) 10-89 parts by weight of a polyamide and/or a thermoplastic polyester. The hydrogenated diene copolymer (A) is as mentioned above, and the amount of the (A) component used is preferably 1–40 parts by weight, more preferably 3-30 parts by weight, and most preferably 5-20 parts by weight. When it is less than 1 part by weight, the impact resistance is inferior and when it exceeds 50 parts by weight, the heat resistance and surface appearance of molded article are inferior.

The polyphenylene ether resin (B') is that mentioned above as one of the component (B). The amount of the polyphenylene ether used is 89-5 parts by weight, preferably 60-5 parts by weight, more Preferably 60-10 parts by weight. When it exceeds 89 parts by weight, the impact resistance and the surface property of molded article are inferior and when it is less than 10 parts by weight, the heat resistance is inferior.

The polyamide includes those obtained by condensing a linear diamine represented by the formula, $H_2N—(CH_2)_a—NH_2$ in which a is an integer of 4 to 12 with a linear carboxylic acid represented by the formula, $HO_2C—(CH_2)_bCO_2H$ in which b is an integer of 2 to 12 and those obtained by ring-opening polymerization of a lactam.

Perferable specific examples of the polyamide are nylon 6,6, nylon 6,9, nylon 6,10, nylon 6,12, nylon 6, nylon 12, nylon 11, nylon 4,6 and the like.

Copolyamides such as nylon 6/6, nylon 6/6,10, nylon 6/12, nylon 6/6,6/12, nylon 6/6,6/6,10, nylon 6/6,6/12 and the like may also be used.

Moreover, there can also be used nylon 6/6,T (T is tetraphthalic acid component); semi-aromatic polyamides obtained from an aromatic dicarboxylic acid such as terephthalic acid or isophthalic acid with meta-xylenediamine or an alicyclic diamine; polyamides obtained from meta-xylenediamine and the above-mentioned linear carboxylic acid; polyesteramide, polyetheramide and polyesteretheramide.

The polyamides may be used alone or in combination of two or more. Particularly, nylon 6,6, nylon 6 and nylon 4,6 are preferable.

The thermoplastic polyester resin is a polyester compound consisting of a dicarboxylic acid and a diol compound, and a substantially linear thermoplastic polymer having a relatively high molecular weight. Preferred are polymeric glycol esters of terephthalic acid and isophthalic acid. These polymers are commercially available and can be produced by the known production methods (see U.S. Pat. Nos. 2,465,319 and 3,047,539). That is, it can be produced by subjecting a phthalic acid ester to alcoholysis and subsequent polymerization or by heating free phthalic acid or its halogenated derivative and a glycol to polymerize them, or by a similar production method.

The thermoplastic polyester is preferably a high molecular weight polymeric glycol terephthalate or isophthalate having recurring unit represented by the formula (2) or a mixture of these esters:

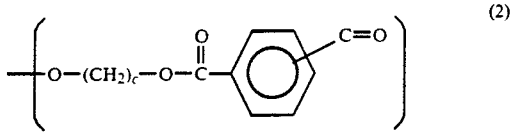

wherein c is preferably an integer of 2 to 10, particularly preferably 2 to 4 in view of the physical properties of the composition. Also, a copolymer of terephthalic acid and isophthalic acid containing up to 30% of isophthalic acid unit can appropriately be used.

Particularly preferable polyesters are polyethylene terephthalate and poly-1,4-butylene terephthalate.

Also, branched polyethylene terephthalate, branched poly-1,4-butylene terephthalate can be used. Such branched polymers may contain a branching component having at least three ester-forming groups in a small amount, for example, up to 5 mole %, based on the terephthalic acid unit.

The branching component may be not only one forming a branch in the acid portion of the polyester but also one forming a branch in the polyol unit portion or a mixture of the two. Examples of such a branching component are tri- or tetra-carboxylic acid, for example, trimesic acid, trimellitic acid, pyromellitic acid and lower alkyl esters of the acids, polyols, preferably tetrols such as pentaerythritol and dihydroxydicarboxylic acids, hydroxydicarboxylic acids and their derivatives such as dimethyl hydroxyterephthalate and the like.

These branched polyesters can be prepared by a method similar to the method of preparing a branched poly(1,4-butylene terephthalate) resin described in U.S. Pat. No. 3,953,404.

The high molecular weight polyester which is useful in carrying out this invention has an intrinsic viscosity of at least 0.2 dl/g, preferably 0.4–2 dl/g, as measured in a mixture of o-chlorophenol or phenol and tetrachloroethane (60:40 by weight) at 25°–30° C.

As the thermoplastic polyester used in this invention, a copolyester is also useful, and preferably, a segment copolyester is used which has many recurring ether-ester and/or ester units as described in, for example, U.S. Pat. Nos. 3,651,014, 3,763,109 and 3,766,146. The thermoplastic polyesters may be used alone or in combination of two or more.

The amount of polyamide or thermoplastic polyester used is 10–89 parts by weight, preferably 20–89 parts by weight, more preferably 30–89 parts by weight, and particularly preferably 40–80 parts by weight. When it is less than 10 parts by weight, the impact resistance and the surface property of molded article are inferior and when it exceeds 89 parts by weight, the heat resistance is inferior.

The thermoplastic resin composition comprising the above (A), (B') and (C) components may preferably contain a compatibilizing agent, and all known compatibilizing agents may be used for this purpose.

The compatibilization is illustrated in Japanese Patent Application Kokoku No. 60-11,966, Japanese Patent Application Kokai No. 56-49,753, Japanese Patent Application Kokai Nos. 62-209,165 and 62-253,652, Japanese Patent Application Kokai Nos. 62-127,339 and 62-81,449. Preferably, the compatibilization methods disclosed in Japanese Patent Application Nos. 61-53,475 and 61-70,579 are used.

Other rubbery polymers which may be optionally used along with the hydrogenated diene copolymer (A) are diene rubbers such as polybutadiene, styrene-butadiene copolymer, butadiene-(meth)acrylic acid ester copolymer, polyisoprene and the like; ethylene-α-olefin copolymers, ethylene-α-olefin-polyene copolymers, polyacrylic acid esters; styrene-butadiene block copolymer; styrene-isoprene block copolymer; hydrogenated styrene-butadiene block copolymer, hydrogenated styrene-isoprene block copolymer; a graft-copolymer of styrene on an ethylene-propylene elastomer; ethylenic ionomer resins and the like. The (hydrogenated)styrene-butadiene block copolymer and (hydrogenated)styrene-isoprene block copolymer include AB type, ABA type, ABA taper type and radial teleblock type. These may be used alone or in combination of two or more.

In the preparation of the thermoplastic resin composition comprising the above (A), (B') and (C) components, the essential components are melt-mixed by an extruder, Banbury mixer, kneader, roll or the like usually at a temperature within a range of 200°-350° C. Preferably, the melt-mixing is conducted by means of a combination of continuous kneader and extruder or by means of an extruder. The extruder is particularly preferably a twin screw extruder in which the screws are rotated in the same direction.

The thermoplastic resin composition comprising the (A), (B') and (C) components may further contain fillers such as glass fiber, carbon fiber, metal fiber, glass beads, glass flake, asbestos, wallastonite, calcium carbonate, talc, barium sulfate, mica, potassium titanate whisker, fluorocarbon resin, molybdenum disulfide and the like, and these may be used alone or in combination of two or more. Of these fillers, glass fiber and carbon fiber have preferably a fiber diameter of 6-10 $\mu$ and a fiber length of at least 30 $\mu$. These fillers are preferably contained in an amount of 5-150 parts by weight per 100 parts by weight of the thermoplastic resin composition. Also, known flame retardant, antioxidart, plasticizer and foaming agent may be added to the thermoplastic resin composition. The flame retardant is preferably a halogen-containing one and the antioxidant is preferably a phosphite-based one. In addition, the thermoplastic resin composition may further contain appropriately other polymers depending upon the performance required, and examples of said other polymers are polystyrene, polyethylene, polypropylene, polycarbonate, polysulfone, polyethersulfone, polyimide, PPS, polyethertherketone, vinylidene fluoride polymer and the like.

The thermoplastic resin composition comprising the (A), (B') and (C) components can be formed into various molded articles by injection molding, sheet extrusion, vacuum forming, profile extrusion, expansion molding or the like. The molded articles can be used in exterior or interior trim materials of automobile, electric or electronic parts, housings and the like utilizing the excellent properties of the molded articles.

The resin composition of this invention is excellent in gloss of molded article, appearance of molded article, impact resistance and weather resistance, and therefore, has a very great value in industry.

In particular, the resin composition comprising the hydrogenated diene copolymer (A) and the polypropylene resin as the (B) component is superior in processability, surface gloss, coatability and impact resistance to conventional resin composition consisting of polypropylene and ethylene-propylene rubber used in industry, and when the molecular characteristics of the hydrogenated diene copolymer contained therein is controlled to an appropriate region, not only a polypropylene resin composition having a high stiffness but also a very soft polypropylene resin composition can be obtained.

Such characteristics cannot be imparted by known polypropylene resin-moldifiers such as ethylene-propylene rubber, hydrogenated block copolymer and the like.

Moreover, the thermoplastic resin composition comprising the (A), (B') and (C) components has highly balanced impact resistance, heat resistance and surface property of mold article, and can provide molded articles such as exterior or interior trim materials for automobiles, electric or electronic parts, housings and the like. Therefore, it has a very high utilizability in industry.

This invention is described more specifically below referring to Examples. However, this invention should not be interpreted as being restricted to the Examples.

In the following Examples, the unit PHR is used to mean parts by weight per 100 parts by weight of polymer.

REFERENCE EXAMPLE 1

Preparation of Hydrogenated Diene Copolymers

Into a 5-liter autoclave were charged 2,500 g of cyclohexane, 75 g of styrene and 425 g of 1,3-butadiene, all of which had been degassed and dehydrated. To the mixture were added 1.5 g of tetrahydrofuran and 0.35 g of n-butyllithium. The resulting mixture was subjected to temperature-elevating polymerization wherein the polymerization temperature was elevated from 30° C. to 80° C. When the conversion reached approximately 100%, 0.13 g of $SiCl_4$ was added to the reaction mixture. Then, 2,6-di-tert-butylcatechol was added, and the resulting mixture was subjected to steam stripping to remove the solvent and dried by a hot roll at 120° C. to obtain a polymer.

The styrene-butadiene random copolymer had a vinyl content of 18%, a styrene content of 15% by weight and a tri- or more-branched polymer content of 42% by weight. When analyzed by GPC, the random copolymer had a number-average molecular weight of 160,000 and a Mw/Mn of 1.7.

The random copolymer was charged into a 3-liter autoclave to prepare a 15% cyclohexane solution thereof. The autoclave inside was purged with nitrogen, and thereto was added a catalyst solution of nickel naphthenate : n-butyllithium : tetrahydrofuran = 1 : 8 : 20 (molar ratio), which had been prepared in a different vessel, at a proportion of 1 mole (in terms of nickel) per 2,000 moles of the olefin portion of the copolymer. Then, hydrogen was introduced into the reaction system, and hydrogenation reaction was effected at 70° C. In the reaction, the hydrogenation percentage was controlled based on the amount of hydrogen absorbed and consumed. Thereafter, the hydrogen in the reaction system was replaced by nitrogen, and 1 PHR of 2,6-di-tert-butylcresol was added as an antioxidant. Catalyst removal and coagulation were effected, followed by drying according to a conventional method.

The resulting hydrogenated diene copolymer (Sample No. 1-1) had a hydrogenation percentage of 85%.

Various random copolymers were prepared in the same manner as above, except that the type and amount of alkenyl aromatic compound used, the amount of n-butyllithium used and the amount of tetrahydrofuran used were varied as shown in Table I-1. At that time, the coupling reaction was effected using no SiCl4 or SiCl4 in different amounts. The random copolymers were subjected to the same hydrogenation reaction as above.

The resulting hydrogenated diene copolymers (Sample Nos. 1-2 to 1-13) are shown in Table I-1.

Molding temperature : 240° C.
Cooling time : 40 sec

The test pieces were measured for physical properties according to the following test methods to obtain the results shown in Table I-2:

(1) Melt flow rate (MFR) (yardstick for processability)

Measured at 230° C. under a load of 2.16 kg in accordance with JIS K 7210.

(2) Izod impact strength

Measured in accordance with JIS K 7110.

(3) Flexural modulus (MF) (yardstick of stiffness)

Measured in accordance with JIS K 7203.

TABLE I-1

| Hydrogenated diene polymer Sample No. | Conjugated diene monomer Name | Alkenyl aromatic compound Name | Conjugated diene monomer portion Vinyl content (% by wt.) | Alkenyl aromatic compound Content (% by wt.) | Molecular weight $Mn \times 10^{-4}$ | Molecular weight distribution $Mw/Mn$ | Conjugated diene monomer portion Hydrogenation perentage (%) | Coupling efficiency (%) |
|---|---|---|---|---|---|---|---|---|
| 1-1 | 1,3-Butadiene | Styrene | 18 | 15 | 16 | 1.7 | 85 | 42 |
| 1-2 | " | " | 18 | 29 | 17 | 1.6 | 91 | 43 |
| 1-3 | " | " | 42 | 15 | 20 | 1.6 | 90 | 43 |
| 1-4 | " | " | 40 | 31 | 17 | 1.5 | 88 | 40 |
| 1-5 | " | " | 45 | 5 | 18 | 1.1 | 90 | — |
| 1-6 | " | " | 42 | 16 | 18 | 1.1 | 94 | — |
| 1-7 | " | " | 63 | 17 | 17 | 1.4 | 98 | 40 |
| 1-8 | " | " | 81 | 5 | 21 | 1.7 | 100 | 45 |
| 1-9 | " | " | 61 | 6 | 17 | 1.5 | 98 | 46 |
| 1-10 | " | " | 74 | 3 | 20 | 1.7 | 93 | 40 |
| 1-11 | " | " | 80 | 14 | 21 | 1.7 | 95 | 42 |
| 1-12 | " | " | 42 | 0 | 18 | 1.1 | 89 | — |
| 1-13 | " | " | 41 | 55 | 16 | 1.7 | 91 | 42 |

EXAMPLES 1-1 to 1-7 AND COMPARATIVE EXAMPLES 1-1 to 1-6

1,890 g of one of the hydrogenated diene copolymer Sample Nos. 1-1 to 1-7 shown in Table 1-1 and 810 g of a polypropylene resin (Noblen BC-2 manufactured by Mitsubishi Petrochemical Co., Ltd.) were melt-kneaded using a 4-liter test Banbury mixer. Each of the kneaded materials obtained was formed into pellets using a 50-mm full-flighted single screw type extruder.

In this pelletization, each of the hydrogenated diene copolymer Sample Nos. 1-1 to 1-7 used could be formed into pellets having no adhesivity. (These pellets are hereinafter referred to as master pellets.)

The master pellets and an additional amount of the polypropylene resin (Noblen BC-2 manufactured by Mitsubishi Petrochemical Co., Ltd.) were melt-kneaded using a 4-liter Banbury mixer so that the final ratio of the hydrogenated diene copolymer (A) and the polypropylene resin (B) became 25/75 by weight, to obtain resin compositions to this invention.

Each of the resin compositions was pelletized by a pelletizer. The resulting pellets were subjected to injection molding by a 6.5-ounce injection molding machine (6.5-ounce in-line screw type manufactured by Nihon Seiko K.K.) to obtain test pieces. The conditions of injection molding were as follows:

Injection pressure Primary pressure 500 kg/cm²
Secondary pressure 400 kg/cm²
Injection time : 15 seconds in total under the primary pressure and the secondary pressure (4) Surface gloss (GL)

Measured in accordance with JIS K 7105.

(5) Bonding strength of film (yardstick of coatability)

A sheet of 2 mm in thickness obtained by injection molding was degreased with ethanol and then surface-treated with trichloroethane vapor. The resulting sheet was coated firstly with a primer (RB291H manufactured by Nihon Bee Chemical K.K.) and then with a polyurethane type coating (R263 manufactured by the same firm) in a total film thickness (as dried) of about 50 μm. The coated sheet was dried to cure the film. Then, the adhesion strength between the sheet and the film was measured by subjecting the film to 180° peeling at a drawing speed of 30 mm/min.

For comparison, each of the hydrogenated diene copolymer Sample Nos. 1-12 and 1-13 shown in Table I-1, an ethylene-propylene copolymer I (EP02P manufactured by Japan Synthetic Rubber Co., Ltd.), an ethylene-propylene copolymer II (EP07P manufactured by Japan Synthetic Rubber Co., Ltd.), an ethylene-1-butene copolymer (Tafmer A4085 manufactured by Mitsui Petrochemical Industries, Ltd.) and a hydrogenated butadiene-styrene-butadiene triblock copolymer (Kraton G1650 manufactured by Shell Chemical) was subjected to the same treatments (melt-kneading with polypropylene resin via master pellets) as for the hydrogenated diene copolymer Sample Nos. 1-1 to 1-7 in Examples 1-1 to 1-7 to obtain resin compositions. (In each composition, the ratio of the copolymer and the polypropylene resin was 25/75 by weight.) Each resin composition was pelletized and injection molded in the same manner as in Examples 1-1 to 1-7, to obtain test pieces. The test pieces were measured for physical properties to obtain the results shown in Table I-2.

TABLE I-2

| | Example | Example | Example | Example | Example | Example |

TABLE I-2-continued

|  | 1-1 | 1-2 | 1-3 | 1-4 | 1-5 | 1-6 |
|---|---|---|---|---|---|---|
| Sample No. of hydrogenated diene copolymer (A) | 1-1 | 1-2 | 1-3 | 1-4 | 1-5 | 1-6 |
| Amount of master pellets used (parts by weight) | 35.7 | 35.7 | 35.7 | 35.7 | 35.7 | 35.7 |
| Amount of polypropylene resin (B) used (parts by weight) | 64.3 | 64.3 | 64.3 | 64.3 | 64.3 | 64.3 |
| (A)/(B) ratio (weight ratio) | 25/75 | 25/75 | 25/75 | 25/75 | 25/75 | 25/75 |
| Physical properties of composition |  |  |  |  |  |  |
| (1) Melt flow rate (g/10 min) | 7.5 | 8.3 | 9.0 | 11 | 8.3 | 11 |
| (2) Izod impact strength (kg · cm/cm) |  |  |  |  |  |  |
| −20° C. | 13 | 14 | 14 | 14 | 14 | 19 |
| −40° C. | 10 | 9.5 | 11 | 11 | 11 | 11 |
| (3) Flexural modulus (kg · f/cm$^2$) | 6100 | 6300 | 5900 | 6100 | 6000 | 6000 |
| (4) Surface gloss (%), incident angle = 60° | 48 | 49 | 46 | 69 | 67 | 72 |
| (5) Film strength (kg/cm) | 1.2 | 1.5 | 1.7 | 1.9 | 1.6 | 1.6 |

|  | Example 1-7 | Comparative Example 1-1 | Comparative Example 1-2 | Comparative Example 1-3 |
|---|---|---|---|---|
| Sample No. of hydrogenated diene copolymer (A) | 1-7 | 1-12 | 1-13 | Ethylene-propylene copolymer I*[1] |
| Amount of master pellets used (parts by weight) | 35.7 | 35.7 | 35.7 | 35.7 |
| Amount of polypropylene resin (B) used (parts by weight) | 64.3 | 64.3 | 64.3 | 64.3 |
| (A)/(B) ratio (weight ratio) | 25/75 | 25/75 | 25/75 | 25/75 |
| Physical properties of composition |  |  |  |  |
| (1) Melt flow rate (g/10 min) | 15 | 11 | 11 | 7.5 |
| (2) Izod impact strength (kg · cm/cm) |  |  |  |  |
| −20° C. | 15 | 17 | 11 | 10 |
| −40° C. | 10 | 10 | 8.0 | 8.5 |
| (3) Flexural modulus (kg · f/cm$^2$) | 5600 | 5600 | 6500 | 5200 |
| (4) Surface gloss (%), incident angle = 60° | 76 | 52 | 73 | 35 |
| (5) Film strength (kg/cm) | 1.9 | 0.9 | 1.6 | 0.9 |

|  | Comparative Example 1-4 | Comparative Example 1-5 | Comparative Example 1-6 |
|---|---|---|---|
| Sample No. of hydrogenated diene copolymer (A) | Ethylene-propylene copolymer II*[2] | Ethylene-1-butene copolymer*[3] | Hydrogenation product of BD-St-BD triblock copolymer*[4] |
| Amount of master pellets used (parts by weight) | 35.7 | 35.7 | 35.7 |
| Amount of polypropylene resin (B) used (parts by weight) | 64.3 | 64.3 | 64.3 |
| (A)/(B) ratio (weight ratio) | 25/75 | 25/75 | 25/75 |
| Physical properties of composition |  |  |  |
| (1) Melt flow rate (g/10 min) | 6.0 | 10 | 5.2 |
| (2) Izod impact strength (kg · cm/cm) |  |  |  |
| −20° C. | 12 | 8.5 | 11 |
| −40° C. | 9.0 | 7.5 | 9.0 |
| (3) Flexural modulus (kg · f/cm$^2$) | 5300 | 6300 | 6400 |
| (4) Surface gloss (%), incident angle = 60° | 11 | 44 | 25 |
| (5) Film strength (kg/cm) | 1.0 | 1.1 | 1.2 |

Note:
*[1] EP02P
*[2] EP07P
*[3] Tafmer A4085
*[4] Kraton G1650

As is clear from Table 1-2, the compositions of Examples 1-1 to 1-7 according to this invention, each using a hydrogenated diene copolymer falling in a lower vinyl content region than the line indicated by the interrelation equation, $x = y + 50$ in which x is a vinyl content (%) in the copolymer and $10 \leq x \leq 65$ and y is an alkenyl aromatic compound content (%) in the copolymer and $3 \leq y \leq 50$, are superior in processability, Izod impact strength at low temperatures, flexural modulus, surface gloss and film strength. In contrast, the composition of Comparative Example 1-1 using a hydrogenated diene copolymer containing no alkenyl aromatic compound is inferior in film strength, and the composition of Comparative Example 1-2 using a hydrogenated diene copolymer containing an alkenyl aromatic compound in a large amount (55% by weight) is inferior in Izod impact strength. Both the compounds of Comparative Examples 1-3 and 1-4 each using an ethylene-propylene copolymer are inferior in Izod impact strength at a very low temperature (−40° C.) and flexural modulus.

The composition of Comparative Example 1-5 using an ethylene-1-butene copolymer is inferior in Izod impact strength at low temperatures.

The composition of Comparative Example 1-6 using a butadiene-styrene-butadiene triblock copolymer has a relatively good balance in Izod impact strength at low temperatures and flexural modulus but is inferior in surface gloss.

Thus, the compositions of Examples 1-1 to 1-7 are highly evaluated in respects of Izod impact strength, flexural modulus, surface gloss and film strength and accordingly possess balanced properties.

EXAMPLES 1-8 to 1-14 AND COMPARATIVE EXAMPLES 1-7 to 1-10

In the same manner as in Examples 1-1 to 1-7, master pellets were prepared using each of the hydrogenated diene copolymer Sample Nos. 1-8 to 1-11 shown in Table I-1. The master pellets had no adhesivity. The master pellets and the same polypropylene resin as used in Examples 1-1 to 1-7 were subjected to the same treatment as in Examples 1-1 to 1-7, to obtain resin compositions of Examples 1-8 to 1-11 according to this invention. For comparison, the ethylene-propylene copolymer I used in Comparative Example 1-1 was melt-kneaded with the same polypropylene resin at weight ratios of 20/80, 30/70, 40/60 and 50/50 to obtain resin compositions of Comparative Examples 1-7 to 1-10, respectively. Each composition was subjected to the same treatment as in Examples 1-1 to 1-7 to prepare test pieces and then measured for physical properties. The results obtained are shown in Table I-3.

ing the same amount of the same polypropylene resin, have improved flexibility and significantly improved low temperature impact resistance.

Meanwhile, the compositions of Comparative Examples 1-8 to 1-10 give low flexural modulus when the proportion of ethylene-propylene copolymer in the composition is made high, but has very low flowability and accordingly inferior processability.

In Examples 1-12 to 1-14, the blending ratios of the components (A) and (B) were changed, but each composition clearly exhibits the meritorious effects of this invention.

REFERENCE EXAMPLE 2

Preparation of hydrogenated diene copolymers (1) Into a 5-liter autoclave were charged 2,500 g of cyclohexane, 150 g of styrene and 350 g of 1,3-butadiene, all of which had been degassed and dehydrated. Thereto were added 2.5 g of tetrahydrofuran and 0.34 g of n-butyllithium. The resulting mixture was subjected to temperature-elevating polymerization wherein the

TABLE I-3

|  | Example 1-8 | Example 1-9 | Example 1-10 | Example 1-11 | Example 1-12 | Example 1-13 | Example 1-14 |
|---|---|---|---|---|---|---|---|
| Sample No. of hydrogenated diene copolymer (A) | 1-8 | 1-9 | 1-10 | 1-11 | 1-4 | 1-4 | 1-4 |
| Amount of master pellets used (parts by weight) | 35.7 | 35.7 | 35.7 | 15.7 | 14.3 | 42.9 | 71.4 |
| Amount of polypropylene resin (B) used (parts by weight) | 64.3 | 64.3 | 64.3 | 64.3 | 85.7 | 57.1 | 28.6 |
| (A)/(B) ratio (weight ratio) | 25/75 | 25/75 | 25/75 | 25/75 | 10/90 | 30/70 | 50/50 |
| Physical properties of composition |  |  |  |  |  |  |  |
| (1) Melt flow rate (g/10 min) | 12 | 11 | 12 | 13 | 13 | 10 | 8.2 |
| (2) Izod impact strength (kg · cm/cm) |  |  |  |  |  |  |  |
| −20° C. | 11 | NB*2 | 18 | 14 | 9.5 | NB | NB |
| −40° C. | 6.0 | 13 | 12 | 5.5 | 8.0 | NB | NB |
| (3) Flexural modulus (kg · f/cm$^2$) | 2300 | 4700 | 3500 | 2700 | 8200 | 5800 | 3700 |
| (4) Surface gloss (%), incident angle = 60° | 65 | 72 | 68 | 73 | 65 | 72 | 73 |

|  | Comparative Example 1-7 | Comparative Example 1-8 | Comparative Example 1-9 | Comparative Example 1-10 |
|---|---|---|---|---|
| Sample No. of hydrogenated diene copolymer (A) | Ethylene-propylene copolymer I*1 | | | |
| Amount of master pellets used (parts by weight) | (20)*3 | (30)*3 | (40)*3 | (50)*3 |
| Amount of polypropylene resin (B) used (parts by weight) | 80 | 70 | 60 | 50 |
| (A)/(B) ratio (weight ratio) | 20/80 | 30/70 | 40/60 | 50/50 |
| Physical properties of composition |  |  |  |  |
| (1) Melt flow rate (g/10 min) | 8.0 | 5.9 | 5.5 | 4.4 |
| (2) Izod impact strength (kg · cm/cm) |  |  |  |  |
| −20° C. | 9.5 | NB | NB | NB |
| −40° C. | 8.0 | 11 | NB | NB |
| (3) Flexural modulus (kg · f/cm$^2$) | 5700 | 4700 | 3600 | 2400 |
| (4) Surface gloss (%), incident angle = 60° | 34 | 40 | 67 | 70 |

Note:
*1EP02P
*2NB stands for "Not broken".
*3The copolymer I was melt-kneaded with the polypropylene resin in one stage without preparing master pellets.

As is clear from Table I-3, the compositions of Examples 1-8 to 1-11 according to this invention, each using a hydrogenated diene copolymer falling within the higher vinyl content region than the line indicated by the interrelation equation, $x = y + 50$ in which x is a vinyl content (%) in the copolymer and $50 \leq x \leq 90$ and y is an alkyl aromatic compound content (%) in the copolymer and $y \leq 20$, are superior in processability, Izod impact strength at low temperatures and surface gloss. These compositions, as compared with the compositions of Comparative Examples 1-3 to 1-6 contain-polymerization temperature was elevated from 30° C. to 80° C. When the conversion reached approximately 100%, 0.14 g of SiCl$_4$ was added to the reaction mixture.

Then, 2,6-di-tert-butyl catechol was added, and the resulting mixture was subjected to steam stripping to remove the solvent and dried by a hot roll at 120° C. to obtain a polymer. The thus obtained styrene-butadiene copolymer had a vinyl content of 30%, a styrene content (Bd-ST) of 30% by weight and a tri- or more-branched polymer content of 56% by weight. When analyzed by GPC, the copolymer had a number-average molecular weight of 32,000 and a Mw/Mn of 1.5.

(2) The conjugated diene copolymer obtained in (1) above was charged into a 3-liter autoclave to prepare a 15% cyclohexane solution thereof. The autoclave inside was purged with nitrogen, and to the solution was added a catalyst solution of nickel naphthenate : n-butyllithium: tetrahydrofuran=1: 8 : 20 (molar ratio) which had been prepared in a different vessel, at a proportion of 1 mole (in terms of nickel) per 2,000 moles of the olefin portion of the copolymer. Then, hydrogen was introudced into the reaction system, and hydrogenation reaction was effected at 70° C. In the reaction, the hydrogenation percentage was controlled based on the amount of hydrogen absorbed and consumed. Thereafter, the hydrogen in the reaction system was replaced by nitrogen, and 1 PHR of 2,6-di-tert-butyl-p-cresol was added as an antioxidant. Catalyst removal and coagulation were repeated, followed by drying according to a conventional method, to obtain a hydrogenated diene copolymer (Sample No. 2-1) having a hydrogenation percentage of 90%.

Sample Nos. 2-2 to 2-13 were obtained in the same manner.

Incidentally, Sample Nos. 2-1 to 2-8 are components (A) falling within the range of this invention, and Sample Nos. 2-9 to 2-13 are outside the range of this invention.

EXAMPLES 2-1 to 2-11

Compositions were prepared according to the compounding recipes shown in Table II-1. From each of the compositions were prepared test pieces for evaluation, using an injection machine. The test pieces were evaluated for physical properties to obtain the results shown in Table II-1.

As is clear from Table 2-1, thermoplastic resin compositions intended by this invention were obtained in Examples 2-1 to 2-11.

The physical properties of each thermoplastic resin composition were measured in accordance with the following test methods:

(1) Izod impact strength (1/4 in., notched)

Measured in accordance with ASTM D 256 on a molded article prepared by molding the resin by an 8-ounce injection machine (cylinder temperature=200° C.).

(2) Tensile strength

Measured in accordance with ASTM D 638 on a molded article prepared by molding the resin by an 8-ounce injection machine (cylinder temperature=200° C.).

(3) Gloss

Gloss at 45° reflection was measured in accordance with ASTM D 523 on a molded article prepared by molding the resin by an 8-ounce injection machine (cylinder temperature=200° C.).

(4) Weather resistance

A sample was exposed for 1,000 hours in a sunshine weathermeter (WEL-6XS-DC manufactured by Suga Shikenki K.K.) using a carbon arc as a light source, and then measured for Izod impact strength.

Test conditions

Black panel temperature: 63+±3° C.
Chamber inside humidity: 60±5% R.H.
Rainfall cycle: 18 minutes every two hours
Carbon exchange cycle: 60 hours
Izod impact strength: ASTM D 256 (Sectional area: ⅛ in.×½ in.)

Comparative Examples 2-1 to 2-5

Compositions were prepared according to the compounding recipes shown in Table 2-1. Test pieces were prepared from each composition in the same manner as in Examples 2-1 to 2-11 and evaluated in accordance with the same test methods as used in Examples 2-1 to 2-11. The evaluation results are shown in Table II-1. A description is made on each Comparative Example below.

Comparative Example 2-1: This is a case of a composition containing the component (A) of this invention in an amount smaller than the range specified by this invention. The composition has poor impact resistance.

Comparative Example 2-2: This is a case of a composition containing the component (A) of this invention in an amount larger than the range specified by this invention. The composition has poor gloss.

Comparative Examples 2-3 and 2-4: Each of them is a case of a composition containing the component (A) whose hydrogenation percentage is lower than the range specified by this invention. Each composition is inferior in gloss and weather resistance.

Comparative Example 2-5: This is a case of a composition containing the component (A) whose styrene content is larger than the range specified by this invention. The composition has poor impact resistance.

TABLE II-1

|  | Example | | | | | | | |
| --- | --- | --- | --- | --- | --- | --- | --- | --- |
|  | 2-1 | 2-2 | 2-3 | 2-4 | 2-5 | 2-6 | 2-7 | 2-8 |
| Sample No. of hydrogenated diene polymer | 2-1 | 2-1 | 2-1 | 2-1 | 2-2 | 2-3 | 2-4 | 2-5 |
| (1) Bound styrene content (%) | 30 | 30 | 30 | 30 | 30 | 30 | 30 | 30 |
| (2) Molecular weight (× 10$^4$) | 25 | 25 | 25 | 25 | 50 | 10 | 25 | 23 |
| (3) Mw/Mn | 1.5 | 1.5 | 1.5 | 1.5 | 1.5 | 1.5 | 1.4 | 1.5 |
| (4) Hydrogenation percentage (%) | 90 | 90 | 90 | 90 | 90 | 95 | 90 | 98 |
| (5) Vinyl content (%) | 30 | 30 | 30 | 30 | 30 | 32 | 15 | 50 |
| (6) Mixing ratio | | | | | | | | |
| Hydrogenated diene polymer (%) | 10 | 20 | 30 | 40 | 20 | 20 | 20 | 20 |
| Polystyrene*1 (%) | 90 | 80 | 70 | 60 | 80 | 80 | | |
| High-impact polystyrene*2 (%) | | | | | | | 80 | |
| Styrene-maleimide copolymer*3 (%) | | | | | | | | 80 |
| Properties of thermoplastic resin composition | | | | | | | | |
| (1) Izod impact strength (kg · cm/cm) | | | | | | | | |
| 25° C. | 7.5 | 10.5 | 12.3 | 11.4 | 10.5 | 9.0 | 10.1 | 7.5 |
| −25° C. | 5.1 | 6.3 | 7.4 | 8.4 | 7.2 | 6.0 | 7.0 | 5.2 |
| (2) Tensile strength (kg · cm$^2$) | 360 | 320 | 270 | 250 | 320 | 290 | 310 | 280 |
| (3) Gloss | 80 | 78 | 79 | 76 | 71 | 80 | 73 | 72 |

TABLE II-1-continued

|  | | | | | | | | |
|---|---|---|---|---|---|---|---|---|
| (4) Weather resistance (retention of impact strength, %) | 80 | 81 | 82 | 79 | 75 | 81 | 70 | 75 |

| | Example | | | Comparative Example | | | | |
|---|---|---|---|---|---|---|---|---|
| | 2-9 | 2-10 | 2-11 | 2-1 | 2-2 | 2-3 | 2-4 | 2-5 |
| Sample No. of hydrogenated diene polymer | 2-6 | 2-7 | 2-8 | 2-9 | 2-10 | 2-11 | 2-12 | 2-13 |
| (1) Bound styrene content (%) | 10 | 45 | 35 | 30 | 30 | 30 | 30 | 60 |
| (2) Molecular weight ($\times 10^4$) | 25 | 25 | 25 | 25 | 23 | 25 | 25 | 24 |
| (3) Mw/Mn | 1.3 | 1.5 | 1.5 | 1.5 | 1.5 | 1.5 | 1.5 | 1.3 |
| (4) Hydrogenation percentage (%) | 90 | 90 | 75 | 90 | 95 | 50 | 0 | 95 |
| (5) Vinyl content (%) | 30 | 28 | 30 | 29 | 30 | 32 | 30 | 31 |
| (6) Mixing ratio | | | | | | | | |
| Hydrogenated diene polymer (%) | 20 | 20 | 20 | 3 | 75 | 20 | 20 | 20 |
| Polystyrene*1 (%) | 80 | 80 | 80 | 97 | 25 | 80 | 80 | 80 |
| High-impact polystyrene*2 (%) | | | | | | | | |
| Styrene-maleimide copolymer*3 (%) | | | | | | | | |
| Properties of thermoplastic resin composition | | | | | | | | |
| (1) Izod impact strength (kg · cm/cm) | | | | | | | | |
| 25° C. | 11.6 | 8.3 | 10.5 | 2.5 | 9.6 | 9.5 | 7.2 | 4.3 |
| −25° C. | 8.4 | 5.1 | 6.3 | 1.2 | 7.8 | 7.0 | 4.9 | 2.1 |
| (2) Tensile strength (kg · cm$^2$) | 270 | 320 | 320 | 320 | 180 | 300 | 280 | 330 |
| (3) Gloss | 77 | 80 | 72 | 78 | 40 | 50 | 35 | 80 |
| (4) Weather resistance (retention of impact strength, %) | 78 | 80 | 65 | 71 | 75 | 15 | 10 | 82 |

Note:
*1Toporex 525 manufactured by Mitsui Toatsu Chemicals, Inc.
*2Toporex 860 manufactured by Mitsui Toatsu Chemicals, Inc.
*3A copolymer of styrene (70%) and N-phenylmaleimide (30%)

REFERENCE EXAMPLE 3

Preparation of hydrogenated diene copolymers (1) Preparation of Sample No. 3-1

(i) Into a 5-liter autoclave were charged 2,500 g of cyclohexane, 150 g of styrene and 350 g of 1,3-butadiene, were added 2.5 g of tetrahydrofuran and 0.34 g of n-butyllithium. The resulting mixture was subjected to temperature-elevating polymerization wherein the polymerization temperature was elevated from 30° C. to 80° C. When the conversion reached approximately 100%, 0.14 g of SiCl$_4$ was added to the reaction mixture. Then, 2,6-di-tert-butylcatechol was added, and the resulting mixture was subjected to steam stripping to remove the solvent and dried by a hot roll at 120° C. to obtain a polymer. The thus obtained styrene-butadiene copolymer had a vinyl content of 30%, a styrene content of 30% by weight and a tri- or more-branched polymer content of 56% by weight. When analyzed by GPC, the copolymer had a molecular weight distribution (Mw/Mn) of 1.5.

(ii) The conjugated diene copolymer obtained in (i) above was charged into a 3-liter autoclave to prepare a 15% cyclohexane solution thereof. The autoclave inside was purged with nitrogen, and a catalyst solution of nickel naphthenate : n-butyllithium : tetrahydrofuran = 1 : 8 : 20 (molar ratio) which had been prepared in a different vessel was added in a proportion of 1 mole (in terms of nickel) per 2,000 moles of the olefin portion of the copolymer. Then, hydrogen was introduced into the reaction system, and hydrogenation reaction was effected at 70° C. In the reaction, the hydrogenation percentage was controlled based on the amount of hydrogen absorbed and consumed. Thereafter, the hydrogen in the reaction system was replaced by nitrogen, and 1 PHR of 2,6-di-tertbutyl-p-cresol was added as an antioxidant. Catalyst removal and coagulation were repeated, followed by drying according to a conventional method, to obtain a hydrogenated diene copolymer (Sample No. 3-1) having a hydrogenation percentage of 95%.

(2) Preparation of Sample No. 3-2

The same procedure as in Reference Example 3-(1)-(i) was repeated, except that no coupling reaction was effected, to obtain a styrene-butadiene copolymer having a vinyl content of 30% and a styrene content of 30% by weight. The copolymer was subjected to the same treatment as in Reference Example 3-(1)-(ii) to obtain a hydrogenated diene copolymer (Sample No. 3-2) having a hydrogenation percentage of 98%.

(3) Preparation of Sample Nos. 3-3 to 3-5

Hydrogenated diene copolymers (Sample Nos. 3-3 to 3-5) were obtained in the same manner.

All of these hydrogenated diene copolymers (Sample Nos. 3-1 to 3-5) are shown in Table III-1.

TABLE III-1

| Sample No. | 3-1 | 3-2 | 3-3 | 3-4 | 3-5 |
|---|---|---|---|---|---|
| Styrene content (wt. %) | 30 | 30 | 5 | 25 | 10 |
| Vinyl content (%) | 30 | 30 | 25 | 15 | 60 |
| Molecular weight | 200,000 | 100,000 | 200,000 | 600,000 | 300,000 |
| Mw/Mn | 1.5 | 1.2 | 1.8 | 1.5 | 1.7 |
| Coupling efficiency (wt. %) | 56 | 0 | 60 | 50 | 60 |
| Hydrogenation percentage (%) | 95 | 98 | 85 | 90 | 99 |

Analytical Methods

The styrene content was obtained from a calibration curve prepared by an infrared method based on the absorption by phenyl group at 679 cm$^{-1}$.

The vinyl content was obtained by an infrared method (Morrero method).

The molecular weight, molecular weight distribution (Mw/Mn) and coupling efficiency were obtained by gel permeation chromatography (GPC).

The hydrogenation percentage was calculated from the spectrum decrease in the unsaturation portion in a H-NMR spectrum (100 MHz) obtained at a 15% concentration using ethylene tetrachloride as a solvent.

Examples 3-1 to 3-17 and Comparative Examples 3-1 to 3-4

Compositions Containing an Optional Polyamide Resin

Polyphenylene ether resins as the component (B) were prepared as follows:

(1) Polymer B-1 (polyphenylene ether)

This polymer was obtained by subjecting 2,6-xylenol to oxidation coupling polymerization. Polymer B-1 had an intrinsic viscosity [η] of 0.4 dl/g as measured at 30° C. in chloroform.

(2) Polymer B-2 (polyphenylene ether)

This polymer was obtained by subjecting a mixture of 2,6-xylenol and 2,3,6-trimethylphenol=90/10 (molar ratio) to oxidation coupling polymerization. Polymer B-2 had an intrinsic viscosity [η] of 0.40 dl/g as measured under the same conditions as above.

(3) Polymer B-3 (maleic anhydride-modified polyphenylene ether)

100 parts by weight of polymer B-1, 2 parts by weight of maleic anhydride and 1.0 part by weight of 2,5-dimethyl-2,5-di(tert-butylperoxy)hexane were dry blended at room temperature. The blend was melt-kneaded using a vented twin-screw extruder in which the screws were rotated in the same direction at a cylinder temperature of 280° C. at 150 rpm and then pelletized to obtain pellets of maleic anhydride-modified polyphenylene ether.

The following polyamides were used as the component (C):

(1) Polymer C-1: Nylon 6 (Amylan CM1017 manufactured by TORAY INDUSTRIES CO., LTD.)
(2) Polymer C-2: Nylon 6 (Amylan CM1007 manufactured by TORAY INDUSTRIES CO., LTD.)
(3) Polymer C-3: Nylon 6,6 (Amylan CM3006 manufactured by TORAY INDUSTRIES CO., LTD.)
(4) Polymer C-4: Nylon 4,6 manufactured by DSM.
(5) Polymer C-5: PBT Duranex XD499 manufactured by Polyplastics K.K.
(6) Polymer C-6: PET RY523 manufactured by Nihon Unipet K.K.

Components (A), (B), (C) and maleic anhydride were mixed according to the compounding receipt shown in Table III-2. The first stage components and the second stage component in Table III-2 indicate that in the extrusion and kneading step, the first stage components were added at the first stage and the second stage component was added in the middle of extruder.

Each mixture was pelletized using a twin screw extruder (PCM-45 manufactured by Ikegai Corp.) at 300 rpm. Each of the resulting thermoplastic resin compositions in the pellet form was thoroughly dried in a dehumidifying drier and then subjected to injection molding by an injection machine to prepare test pieces. The test pieces were evaluated for impact resistance, heat resistance and surface appearance of molded article in accordance with the following test methods to obtain the results shown in Table III-2:

Impact Resistance

Measured in accordance with ASTM D 256 (thickness: ¼ in., notched).

Heat Resistance (Amount of Sag When Heated)

A test piece of ½ in. × ½ in. × 5 in. was fixed leaving a 10-cm length free and kept horizontally. The test piece was allowed to stand in a constant temperature chamber at 180° C. or 190° C. for 1 hour. Then, the amount (mm) of sag of the end was measured.

Surface Appearance of Molded Article

A plate having a weld portion was prepared, and the weld portion was visually checked according to the following criterion:
○: It is difficult to detect the weld portion and the appearance of the weld portion is good.
Δ: The weld portion is somewhat detectable.
x: It is easy to detect the weld portion and the appearance of the weld portion is no good.

TABLE III-2

| | Compounding recipe (parts by weight) | | | | | | Elevation results | | | |
|---|---|---|---|---|---|---|---|---|---|---|
| | First stage components | | | | Second stage componnet | | Impact resistance (kg · cm/cm) | Heat resistance (mm) | | Surface appearance of molded article |
| | Component (B) | | Component (A) | | Maleic anhydride | Component (C) | | | | | |
| | Type | Amount | Sample No. | Amount | Amount | Type | Amount | | 180° C. | 190° C. | |
| Example | | | | | | | | | | | |
| 3-1 | B-1 | 40.9 | 3-2 | 13 | 0.3 | C-2 | 46.1 | 50 | 1.3 | 2.0 | o |
| 3-2 | B-2 | 40.9 | 3-2 | 13 | 0.3 | C-2 | 46.1 | 53 | 1.2 | 1.9 | o |
| 3-3 | B-1 | 40.9 | 3-1 | 13 | 0.3 | C-2 | 46.1 | 57 | 1.3 | 2.0 | o |
| 3-4 | B-1 | 40.9 | 3-3 | 13 | 0.3 | C-2 | 46.1 | 58 | 1.1 | 1.7 | o |
| 3-5 | B-1 | 40.9 | 3-4 | 13 | 0.3 | C-2 | 46.1 | 63 | 1.2 | 1.9 | o |
| 3-6 | B-1 | 40.9 | 3-5 | 13 | 0.3 | C-2 | 46.1 | 55 | 1.1 | 1.8 | o |
| 3-7 | B-1 | 40.9 | 3-2 | 13 | 0.3 | C-1 | 46.1 | 42 | 1.3 | 2.0 | o |
| 3-8 | B-1 | 40.9 | 3-2 | 13 | 0.3 | C-3 | 46.1 | 54 | 1.1 | 1.6 | o |
| 3-9 | B-1 | 40.9 | 3-2 | 13 | 0.3 | C-4 | 46.1 | 48 | 0.5 | 1.2 | o |
| 3-10 | B-1 | 40.9 | 3-2 | 13 | 0.3 | C-5 | 46.1 | 36 | 1.6 | 2.5 | o |
| 3-11 | B-1 | 40.9 | 3-2 | 13 | 0.3 | C-6 | 46.1 | 29 | 1.3 | 2.0 | o |
| 3-12 | B-3 | 40.9 | 3-2 | 13 | — | C-2 | 46.1 | 34 | 1.3 | 2.0 | o |
| 3-13 | B-1 | 47.9 | 3-2 | 13 | 0.3 | C-2 | 39.1 | 50 | 0.9 | 1.4 | o |
| 3-14 | B-1 | 34.8 | 3-2 | 13 | 0.3 | C-2 | 52.2 | 56 | 1.5 | 2.5 | o |
| 3-15 | B-1 | 44.2 | 3-5 | 6 | 0.3 | C-2 | 49.8 | 34 | 0.9 | 1.3 | o |
| 3-16 | B-1 | 37.6 | 3-2 | 20 | 0.3 | C-2 | 42.4 | 68 | 2.2 | 3.4 | o |
| 3-17 | B-1 | 17.4 | 3-2 | 13 | 0.3 | C-5 | 69.6 | 38 | 1.9 | 3.2 | o |
| Comparative Example | | | | | | | | | | | |
| 3-1 | B-1 | 96.5 | 3-2 | 0.5 | 0.3 | C-2 | 3 | 8 | 0.1 | 0.4 | x |
| 3-2 | B-1 | 5 | 3-2 | 0.5 | 0.3 | C-2 | 94.5 | 6 | 0.8 | 1.8 | o |
| 3-3 | B-1 | 40.9 | 3-6 | 13 | 0.3 | C-2 | 46.1 | 45 | 5 | Severe deformation | | x |

TABLE III-2-continued

| | Compounding recipe (parts by weight) | | | | | | Evaluation results | | | |
|---|---|---|---|---|---|---|---|---|---|---|
| | First stage components | | | | Maleic anhydride Amount | Second stage componnet Component (C) | | Impact resistance (kg · cm/cm) | Heat resistance (mm) | | Surface appearance of molded article |
| | Component (B) | | Component (A) | | | | | | | | |
| | Type | Amount | Sample No. | Amount | | Type | Amount | | 180° C. | 190° C. | |
| 3-4 | B-1 | 40.9 | 3-7 | 13 | 0.3 | C-2 | 46.1 | 46 | 4 | Severe deformation | x |

As is clear from Table III-2, the composition of Comparative Example 3-1 containing the component (A) of this invention in an amount larger than the range specified by this invention is inferior in impact resistance and surface apparance of molded article. The composition of Comparative Example 3-2 containing the component (A) of this invention in an amount larger than the range specified by this invention is inferior in impact resistance. The compositions of Comparative Examples 3-3 and 3-4 using a rubbery polymer other than specified by this invention are inferior in heat resistance and surface appearance of molded article.

Examples 3-18 and 3-19 and Comparative Examples 3-5 and 3-6

Composition containing a polyphenylene ether resin as the component (B)

Polymer B-4

A modified polyphenylene ether resin obtained by melt-mixing 40% by weight of Polymer B-1 (obtained by subjecting 2,6-xylenol to oxidation coupling polymerization) and 60% by weight of a polystyrene (Toporex 500-51 manufactured by Mitsui Toatsu Chemicals, Inc.).

TABLE III-3

| | Compounding recipe (parts by weight) | | | | Evaluation results | |
|---|---|---|---|---|---|---|
| | Component (A) | | Component (B) | | Impact resistance (kg.cm/cm) | Surface apparatus of molded article |
| | Sample No. | Amount | Type | Amount | | |
| Example 3-18 | 3-2 | 20 | B-4 | 80 | 20 | o |
| Example 3-19 | 3-5 | 30 | B-4 | 70 | 29 | o |
| Comparative Example 3-5 | 3-6 | 20 | B-4 | 80 | 5 | x |
| Comparative Example 3-6 | 3-7 | 20 | B-4 | 80 | 10 | x |

Note: Sample No. 3-6: SBS block copolymer (TR-2000 manufactured by Japan Synthetic Rubber Co., Ltd.)
Sample No. 3-7: Hydrogenated SBS block copolymer (Kraton G1650 manufactured by Shell)

What is claimed is:

1. A hydrogenated diene copolymer resin composition comprising (A) 5-70% by weight of a hydrogenated diene copolymer which is a hydrogenation product of a random copolymer of at least one conjugated diene and 3-50% by weight of an alkenyl aromatic compound having a number average molecular weight of 5,000-1,000,000 and a molecular weight distribution (Mw/Mn) of 10 or less, the vinyl content in the diene portion of the random copolymer being 10-90%, at least 70% of the olefinic unsaturation of the random copolymer being hydrogenated, and (B) 95-30% by weight of at least one resin selected from the group consisting of a polypropylene resin, a polyphenylene ether resin and an alkenyl aromatic compound polymer resin.

2. The hydyrogenated diene copolymer resin composition according to claim 1, wherein at least 80% of the olefinic unsaturation of the random copolymer is hydrogenated.

3. The hydrogenated diene copolymer resin composition according to claim 1, wherein the random copolymer has a number average molecular weight of 30,000 to 300,000.

4. The hydrogenated diene copolymer resin composition according to claim 1, wherein the random copolymer has a molecular weight distribution (Mw/Mn) of 6 or less.

5. The hydrogenated diene copolymer resin composition according to claim 1, wherein the conjugated diene of the random copolymer is selected from the group consisting of 1,3-butadiene, isoprene, 1,3-pentadiene, 2,2'-dimethylbutadiene and 3-ethylbutadiene.

6. The hydrogenated diene copolymer resin composition according to claim 1, wherein the conjugated diene of the random copolymer is selected from the group consisting of 1,3-butadiene, isoprene and 1,3-pentadiene.

7. The hydrogenated diene copolymer resin composition according to claim 1, wherein the conjugated diene of the random copolymer is 1,3-butadiene.

8. The hydrogenated diene copolymer resin composition according to claim 1, wherein the alkenyl aromatic compound of the random copolymer is selected from the group consisting of styrene, α-methylstyrene, p-methylstyrene, p-ethylstyrene and vinylnaphthalene.

9. The hydrogenated diene copolymer resin composition according to claim 1, wherein the alkenyl aromatic compound of the random copolymer is selected from the group consisting of styrene, p-methylstyrene and p-ethylstyrene.

10. The hydrogenated diene copolymer resin composition according to claim 1, wherein the alkenyl aromatic compound of the random copolymer is styrene.

11. The hydrogenated diene copolymer resin composition according to claim 1, wherein the random copolymer is of 1,3-butadiene and styrene.

12. The hydrogenated diene copolymer resin composition according to claim 1, wherein the (B) component is polypropylene resin.

13. The hydrogenated diene copolymer resin composition according to claim 12, wherein the polypropylene resin has a melt flow index of 0.3-100 g/10 min at 230° C.

14. The hydrogenated diene copolymer resin composition according to claim 12, wherein the polypropylene resin is at least one member selected from the group consisting of homopolymer of propylene and copolymers of propylene and an α-olefin having 4 to 12 carbon atoms.

* * * * *